US012662782B2

(12) United States Patent　　　(10) Patent No.:　US 12,662,782 B2

Sprague　　　　　　　　　　　　　(45) Date of Patent:　Jun. 23, 2026

---

(54) BARRIER STANDS

(71) Applicant: ABSOLUTE MUSEUM & GALLERY PRODUCTS LTD, South Moulton (GB)

(72) Inventor: Samuel Sprague, Lynton (GB)

(73) Assignee: ABSOLUTE MUSEUM & GALLERY PRODUCTS LTD (GB)

( * ) Notice: Subject to any disclaimer, the term of this patent is extended or adjusted under 35 U.S.C. 154(b) by 887 days.

(21) Appl. No.: 17/795,110

(22) PCT Filed: Jan. 27, 2021

(86) PCT No.: PCT/GB2021/050183

§ 371 (c)(1),
(2) Date: Jul. 25, 2022

(87) PCT Pub. No.: WO2021/152300

PCT Pub. Date: Aug. 5, 2021

(65) Prior Publication Data

US 2022/0372717 A1　　　Nov. 24, 2022

(30) Foreign Application Priority Data

Jan. 27, 2020　(GB) .................................... 2001098

(51) Int. Cl.
E01F 13/02 (2006.01)
F16G 11/10 (2006.01)

(52) U.S. Cl.
CPC .......... E01F 13/028 (2013.01); F16G 11/103 (2013.01)

(58) Field of Classification Search
CPC ....... E01F 13/02; E01F 13/022; E01F 13/028; F16G 11/04; F16G 11/044; F16G 11/046;
(Continued)

(56) References Cited

U.S. PATENT DOCUMENTS 2,315,516 A * 4/1943 Gray ........................ E01F 13/04
52/298
5,501,429 A * 3/1996 Sakuma ................ E01F 13/028
256/45

(Continued)

FOREIGN PATENT DOCUMENTS

DE 3345324 A1 * 6/1985
EP 0685602 A1 12/1995
(Continued)

*Primary Examiner* — Jonathan P Masinick

(74) *Attorney, Agent, or Firm* — Endurance Law Group PLC; James R. Yee

(57) ABSTRACT

An improved barrier stand (3) for a corded exhibition barrier (1) is disclosed. The barrier stand (3) comprises a socket (7), and a post (5). The post (5) is adapted to be mounted on abase (4) so as to stand in a vertical position. The post defines an open top, and the socket (7) is retained by the open top of the post (5). The socket (7) defines a channel leading between an exterior of the barrier stand (3) and a hollow interior of the post (5). The socket (7) further defines gripping structures for gripping a cord (2) extending along the channel. A first set of the gripping structures are shaped and arranged to permit insertion of the cord (2) along the channel towards the interior of the post (5), but resist retraction of the cord (2) away from the interior of the post (5).

21 Claims, 3 Drawing Sheets

(58) Field of Classification Search
CPC ...... F16G 11/10; F16G 11/103; F16G 11/105;
F16G 11/106
See application file for complete search history.

(56) References Cited

U.S. PATENT DOCUMENTS

| | | | | |
|---|---|---|---|---|
| 6,460,488 B1 * | 10/2002 | Manzella | .............. | F16G 11/103 |
| | | | | 119/769 |
| 7,346,963 B2 * | 3/2008 | Takahashi | ............. | F16G 11/048 |
| | | | | 24/136 R |
| 7,574,779 B2 * | 8/2009 | Takahashi | ............. | F16G 11/101 |
| | | | | 24/136 L |
| 10,870,957 B2 * | 12/2020 | Sprague | ................ | E01F 13/028 |
| 2007/0254525 A1 | 11/2007 | Pyron et al. | | |
| 2008/0034556 A1 * | 2/2008 | Liao | ......................... | A43C 3/00 |
| | | | | 24/132 R |
| 2017/0009412 A1 | 1/2017 | Eaton et al. | | |
| 2019/0277054 A1 | 9/2019 | Li | | |

FOREIGN PATENT DOCUMENTS

| | | | |
|---|---|---|---|
| GB | 2262120 A | 6/1993 |
| GB | 2568175 A | 5/2019 |
| GB | 2571078 A | 8/2019 |
| WO | 2017198984 A1 | 11/2017 |

* cited by examiner

BARRIER STANDS

RELATED APPLICATIONS

This application is a national stage application of WO PCT/GB2021/050183, filed on Jan. 27, 2021, which claims priority to GB Patent Application 2001098.9, filed Jan. 27, 2020, the entire disclosures of which is hereby incorporated by reference and relied upon.

FIELD OF THE INVENTION

The present invention relates to a barrier stand for an exhibition barrier. In particular, the invention relates to a barrier stand for an exhibition barrier that includes a cord, with the barrier stand having a socket arranged to grip an end region of the cord. Naturally, the present invention also relates to an exhibition barrier.

BACKGROUND TO THE INVENTION

Exhibition barriers are used in museums, art galleries, and at other venues where artwork or other precious items are exhibited to the public. The barriers are used to guide people in a certain path or to protect objects such as paintings, sculptures or precious items to be viewed by the general public by defining a closed area around or in front of the objects from which the general public are excluded. Such barriers are typically defined by a series of barrier stands, spaced from one another along the boundary between two areas within an exhibition space, the barrier stands supporting a cord between them.

Such barriers are generally known, but can be expensive, awkward and time-consuming to install in locations where only a temporary barrier of a particular length is required, such as in art exhibitions, museums, car showrooms, events and retail environments where the exhibits may be changed from time to time for an exhibition, display or event. One challenge is to provide a barrier that can be quickly, easily and inexpensively erected, and then removed by exhibition staff with little or no expertise or experience.

An improvement conceived by the inventor of the present application that addresses some of these issues is disclosed in International publication number WO 2017/198984 the content of which is hereby incorporated by reference to the extent permissible by applicable law.

WO 2017/198984 discloses a barrier stand to which a cord or cable can be quickly and inexpensively attached. This barrier stand comprises a clamping device that can clamp to a cord to secure it to the barrier stand. The barrier stand allows the cord to be fed into the body of the barrier stand, thereby providing a means by which the length of the cord between a barrier stands can be easily adjusted without needing to cut the cord to precisely the right length or tie knots in the cord.

Whilst this is an elegant solution, the inventor has nonetheless conceived further improvements that can be made to such a barrier stand. In particular, the inventor has recognised that the moving parts of the clamping device make the barrier stand relatively complicated and expensive.

It is against this background that the present invention has been devised.

SUMMARY OF THE INVENTION

According to a first aspect of the present invention there is provided a barrier stand according to claim 1.

The barrier stand is preferably suitable for an exhibition barrier. Such a barrier may comprise a cord, preferably an elasticated cord, such as a bungee cord. Ideally the cord is suspended and gripped by a plurality of barrier stands to define the exhibition barrier.

Preferably, the barrier comprises a post and/or a socket. The post may be adapted to be mounted on a base so as to stand in a vertical position. The post may define an open top and the socket may be retained by the open top of the post. Ideally, the socket defines a channel leading between an exterior of the barrier stand and a hollow interior of the post.

Preferably, the socket defines gripping structures for gripping a cord ideally extending along the channel. A first set of the gripping structures may be shaped and/or arranged to permit insertion of a cord along the channel towards the interior of the post. Moreover, the first set of the gripping structures may be shaped and/or arranged to resist retraction of the cord away from the interior of the post.

The first set of gripping structures may be shaped and/or arranged to increase their frictional engagement with the cord during its retraction away from the interior of the post.

The barrier stand may further comprise a second set of gripping structures shaped and/or arranged to grip a cord extending along the channel. Ideally, the second set of gripping structures are spaced from the first set of gripping structures.

Preferably, the first and second set of gripping structures are shaped and/or arranged to grip the cord at different orientations to one another so that the cord follows a non-linear path along the channel.

Preferably, the socket comprises a head portion and a tail portion. The tail portion may be fitted within the top of the post. The head portion may be arranged to protrude from the top of the post. Preferably, the channel defined by the socket extends through the tail portion and head portion.

Preferably, the tail portion comprises a sidewall having a outer surface that is sized and/or tapered relative to an inner surface of the post to form an interference fit with it. The outer surface of the sidewall of the tail portion may narrow at an end of the tail portion to between 70% and 95% of the size of the inner diameter of the post.

Preferably, the tail portion defines the first set of gripping structures, and the head portion defines the second set of gripping structures.

Preferably, the second set of gripping structures comprises at least one slot defined by the head portion. The at least one slot is ideally open at its upper end to receive a cord of predetermined diameter. The slot may be shaped and arranged to pinch the cord thereby to grip the cord. The second set of gripping structures defined by the head portion may comprises a plurality of slots, equidistantly spaced at regular intervals about the periphery of the head portion.

The first set of gripping structures may comprise at least one finger. Ideally, the at least one finger extends, from a wide root to a narrow tip of the finger, in a direction that is axially-downward with respect to a central longitudinal axis. When the socket is fitted to the post, this is in a direction down towards the interior of the post. The at least one finger may be oriented, with respect to the central longitudinal axis, at a finger angle of between 5 and 60 degrees, preferably between 15 and 45 degrees, and more preferably between 20 and 40 degrees. The at least one finger may define at least one gully that widens in a direction that is axially-downward with respect to the central longitudinal axis. The at least one finger may define a sharp-transition boundary located at a boundary between the at least one finger and the at least one gully.

The first set of gripping structures may comprise a plurality of fingers that extend radially-inward and axially-downward with respect to the central longitudinal axis. The plurality of fingers may define a corresponding plurality of gullies between them. The fingers may be circumferentially arranged and spaced from one another.

The fingers may define an open central region of the channel via which the cord can extend. The open central region of the channel may be circumferentially surrounded at regular intervals by the tips of the fingers. Preferably, the first set of gripping structures comprise three fingers that define three gullies between them, and the fingers are circumferentially arranged and spaced from one another at 120 degree intervals.

Preferably, the socket is constructed from an integral piece of material. Preferably, the socket is constructed from an inflexible material, such as high-impact polystyrene.

According to a second aspect of the present invention there is provided an exhibition barrier comprising at least one barrier stand according to the first aspect of the present invention. The barrier ideally also comprises at least one cord, ideally an elastic cord, of predetermined diameter. Preferably, the cord has a diameter that is suitable for insertion into the socket, and when so inserted causes the socket to grip the cord. A plurality of barrier stands may be provided, with the cord being suspended and gripped by each of them.

According to a third aspect of the present invention, there is provided a barrier stand socket for holding a cord, and suitable for use with the barrier stand of the first aspect, or the barrier of the second aspect of the present invention.

A fourth aspect of the present invention may reside in a method of manufacturing a barrier stand, a barrier, and/or a socket according to the first, second and/or third aspects of the present invention.

Naturally, aspects of the present invention may extend to a plurality of barrier stands according to the first aspect of the present invention interconnected by one or more cords.

Moreover, aspects of the present invention may reside in a barrier kit comprising one or more barrier stands according to the first aspect, and one or more cords.

It will be understood that features and advantages of different aspects of the present invention may be combined or substituted with one another where context allows. For example, the features of the barrier stand described in relation to the first aspect of the present invention may be present on the barrier described in relation to the second aspect of the present invention. Furthermore, such features may themselves constitute further aspects of the present invention. For example, the socket of the barrier stand of the first aspect may itself constitute a further aspect of the present invention.

BRIEF DESCRIPTION OF THE DRAWINGS

In order for the invention to be more readily understood, embodiments of the invention will now be described, by way of example only, with reference to the accompanying drawings in which.

4

Figures 3, 4, 5:
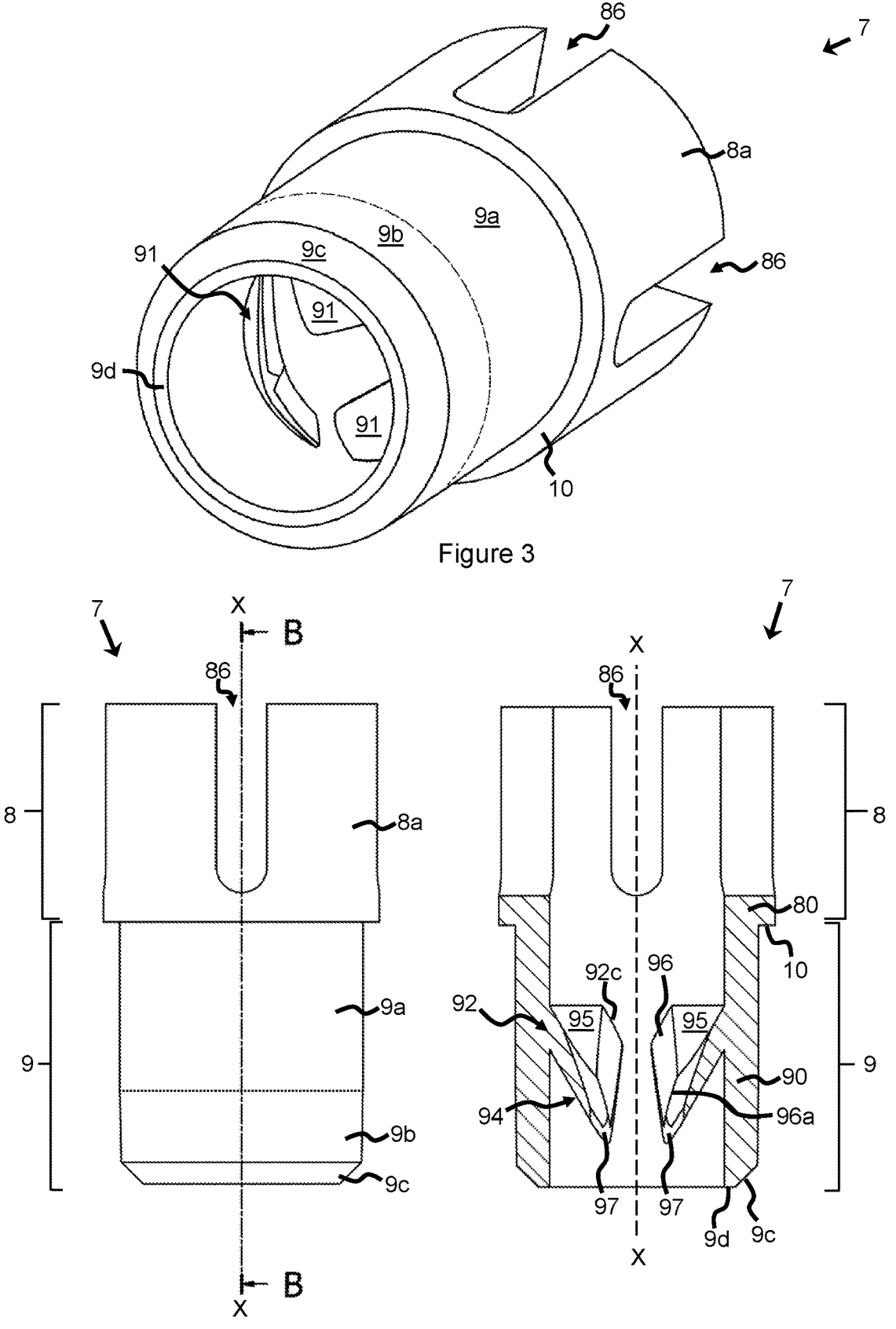
FIG. 3 is a perspective underside view of a socket of the barrier stand of FIG. 1, the socket being shown in isolation.
Figures 6, 7, 8:
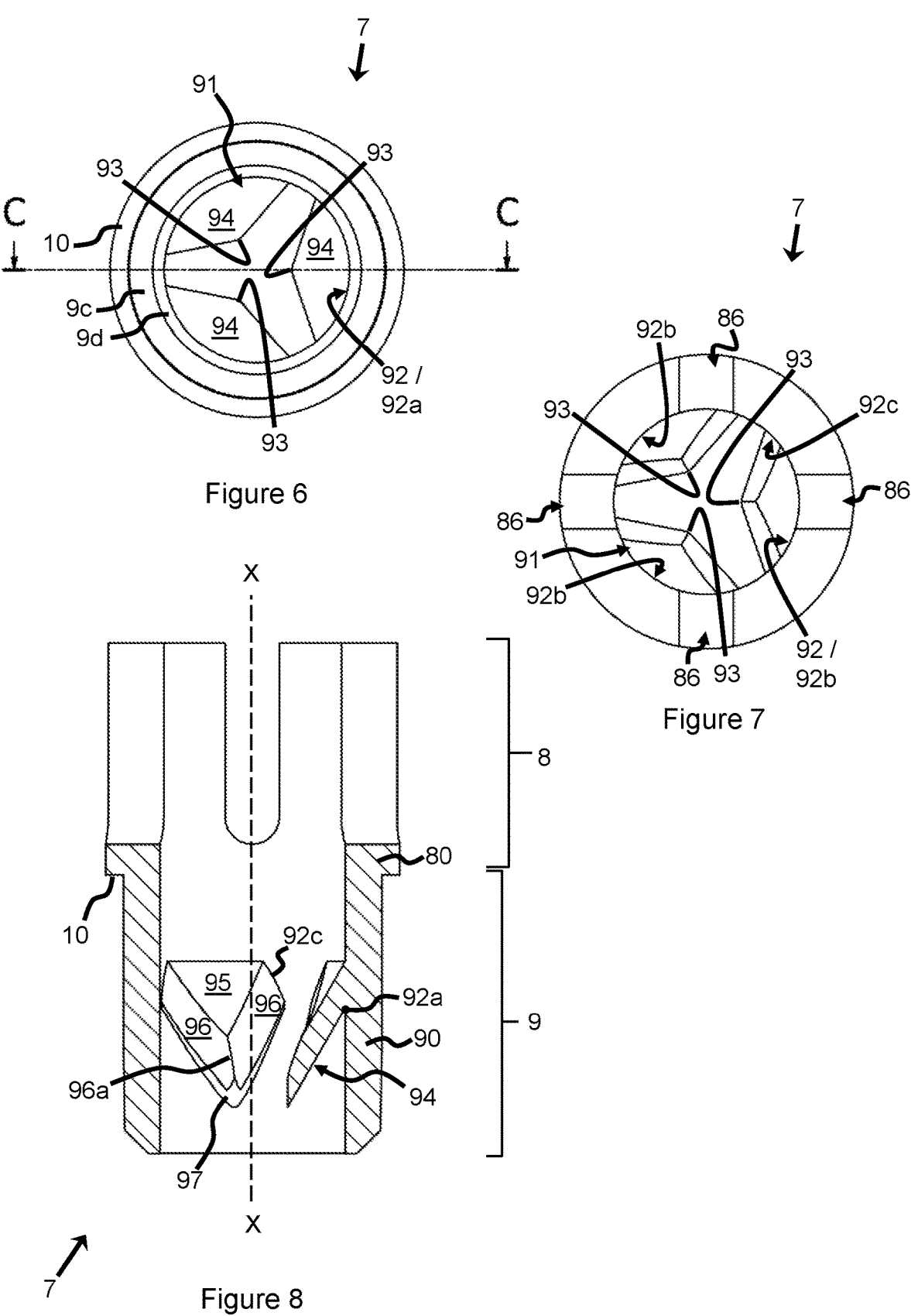

FIG. 4 is a side view of the socket of FIG. 3;

FIG. 5 is cross-sectional view of the socket of FIG. 4, taken along lines B-B;

FIG. 6 is an underneath view of the socket of FIG. 3;

FIG. 7 is an overhead view of the socket of FIG. 3; and

FIG. 8 is a cross-sectional view of the socket of FIG. 6, taken along lines C-C.

SPECIFIC DESCRIPTION

Figure 1:
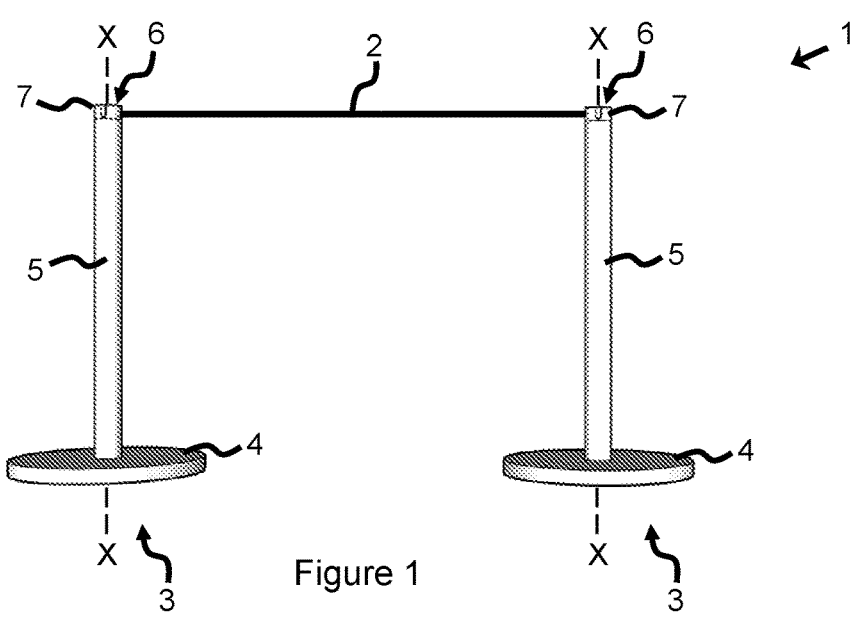
FIG. 1 is a perspective side view of a barrier according to a first embodiment of the present invention, the barrier shown comprising a pair of barrier stands, and a cord suspended between them.

FIG. 1 is a perspective side view of a freestanding barrier 1 according to a first embodiment of the present invention. The barrier 1 as shown comprises a pair of identical barrier stands 3, and a cord 2 suspended between them. In alternative embodiments, a barrier 1 may be defined by a single cord 2, and three or more barrier stands 3.

The cord 2 is flexible elasticated cord of circular cross-section, with a diameter of 5 mm. In the present embodiment, the cord 2 is of a type commonly referred to as a bungee cord, with an elastic core surrounded by a fabric woven sheath.

In use, when the cord 2 is suspended between the pair of barrier stands 3, each stand 3 shown in FIG. 1 grips a respective end region of the cord 2, allowing the cord 2 to be gently stretched longitudinally. The elastic nature of the cord 2 and the grip provided by each barrier stand 3 is sufficient to minimise drooping, ensuring that the cord 2 is held at a substantially regular height between barrier stands 3. As well as providing an aesthetically-pleasing effect, this ensures that the cord 2 is easily-visible and so reduces the chance that the cord 2 presents a trip hazard. In variants where the cord 2 needs to span a large distance, intermediate barrier stands 3 are used to prop up a central region of the cord 2.

Each barrier stand 3 comprises a weighted disc-shaped mounting base 4 surmounted by a hollow tubular upright post 5. Each barrier stand 3 also comprises a cap 6 and a socket 7. The socket is retained by a hollow top of the post 5, and the cap 6 fits over the socket 7. When assembled to one another in use, each of these components of the barrier stand 3 share a central axis X which extends longitudinally in the vertical direction.

The post 5 and base 4 are constructed in the present embodiment predominantly from a metal such as steel. In particular, the post 4 and base 5 are often made of mild steel with powder coated or stainless steel finish. In other embodiments, the post 5 and base 4 may be constructed from other materials that are suitably rigid and durable.

The underside of the weighted base 4 is provided with anti-slip neoprene pads that grip the floor, and so restrain the barrier stands 3 from sliding out of their intended place, in particular when subject to the force imparted by the elasticated cord 2 under tension. Additionally, the size and the weighting of the base 4 is chosen to prevent the barrier stands 3 from being pulled over under a similar force. In the present embodiment, the barrier stands 3 are of a height of 400 mm, and the base 4 is of a diameter of 232 mm. By comparison, in alternatives embodiments, the barrier stands have a height of 1000 mm and the base has a diameter of 335 mm.

The base 4 and post 5 together comprises a base-post interface allowing these two components of the barrier stand to be assembled together securely. The base-post interface ideally comprises complementary screw-thread members, one acting on the base 4, and another on the post 5, and via which the post 5 and base 4 can be progressively tightened against one another. In the present embodiment, this is in the form of a threaded bore member welded to and within the bottom of the post 5 which receives a screw extending upwardly through a central hole formed in the base 4. The post 5 is therefore adapted to be securely mounted on the base 4 to orient the post firmly in the vertical position. The top of the post 5 is open to receive the socket 7, which in turn supports the cap 6.

Figure 2:
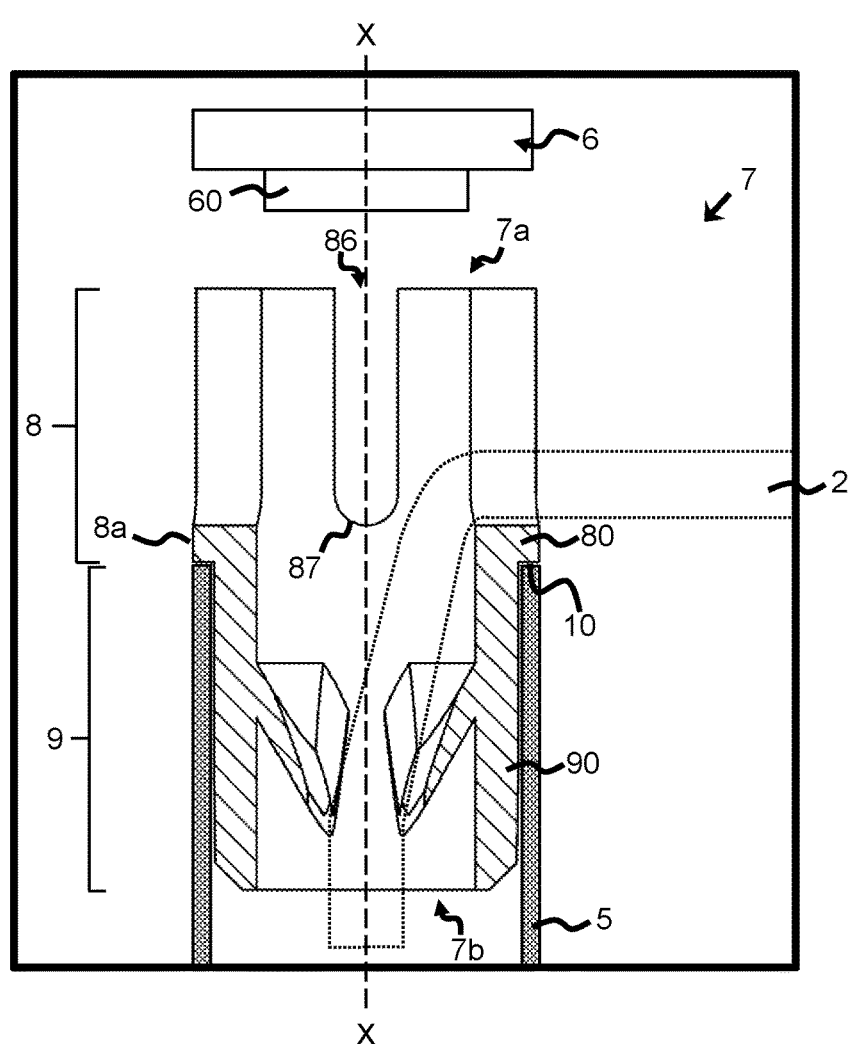
FIG. 2 is a partial cross-sectional view of one of the barrier stands and cord of FIG. 1.

FIG. 2 is a partial cross-sectional view of the top of one of the barrier stands 3 of FIG. 1. The socket 7 is shown fitted into the hollow open top of the post 5. The socket 7 itself defines an internal channel leading between an open top 7a and an open bottom 7b of the socket 7. Accordingly, the channel of the socket leads 7 into the hollow interior of the post 5. An end region of the cord 2 is shown in FIG. 2 in dotted outline. The cord 2 is inserted into the post 5 via the socket 7, the cord 2 extending through the channel. Advantageously, this allows different lengths of cord 2 to be accommodated by not just the socket 7, but also the post 5. This makes the set up of the barrier 1 easier, as a user need not cut the cord exactly to the right length, as a substantial excess length of cord 2 can be easily accommodated within the post 5.

For clarity, the cap 6 is schematically shown in FIG. 2 above the socket 7 but, in normal use, sits on the socket 7. The cap 6 comprises a disc-shaped protrusion 60 sized to be received within the open top 7a of the socket 7 thereby to centre and engage the cap 6 to the socket 7. In alternative embodiments, instead of, or in addition to the disc-shaped protrusion, the cap may have other engagement protrusions that are shaped in complement with the socket 7—such as legs that fit into slots 86.

In the present embodiment, the socket 7 is constructed from an integral piece of material, and in particular is moulded, as a single piece, from high-impact polystyrene. The material is coloured to match the appearance of the post 5. Advantageously, as the socket 7 is a single-piece component, it can be inexpensively mass-produced via manufacturing techniques such as injection moulding.

In other embodiments, the socket 7 may be a single-piece component that is constructed another way. For example, the socket 7 may formed via a 3D printing process for example. Furthermore, the socket 7 may be made of a different material—but is preferably a mouldable plastics material that is rigid when set.

The socket 7 generally comprises an upper head portion 8 and an integrally-formed lower tail portion 9, each having axially-extending sidewalls 80, 90 that conform to the shape of a cylinder, centred on longitudinal axis X. Independently, the head portion 8 and tail portion 9 exhibit rotational symmetry about the longitudinal axis X. The head portion 8 is rotationally symmetrical by order 4, and the tail portion 9 is rotationally symmetrical by order 3.

The sidewall 80 of the head portion 8 of the socket 7 is interrupted by and defines four slots 86 that extend axially downward from the upper end of the sidewall 80 of the head portion 8. Thus, the slots 86 form part of the channel that runs through the socket 7. The slots 86 are equidistantly spaced at regular intervals about the periphery of the head portion 8. Each slot 86 is open at its axially-upper end to receive the cord 2. At an axially-lower end, each slot 86 terminates in an arcuate curve 87. Each slot 86 is 13 mm in axial length, and 3.5 mm wide. Accordingly, the 5 mm elasticated cord 2 is pinched when passing through the slot 86 as shown in FIG. 2, and so is frictionally-engaged by the slot 86. This has the advantageous effect of gripping the cord 2 to resist longitudinal movement of it relative to the slot 86.

In alternative embodiments, the slots 86 may be of a different width—for example, in the range 3 mm to 4.5 mm. Narrower slot widths impart a more powerful grip but make the cord more difficult to insert, and vice-versa. The slot width of 3.5 mm of the present embodiment achieves a satisfactory balance of grip and ease of insertion for a cord of 5 mm diameter.

Also in alternative embodiments, there may be a greater or fewer number of slots. Nonetheless, four regularly-spaced slots are preferred as this facilitates the standard arrangement of a series of three or more barrier stands; i.e. either in a straight line, or turning a 90 degree corner. In such a series, intermediate barrier stands 3 prop up a central region of the cord 2 which passes through two diametrically opposed slots 86 to lead in a straight line, or two adjacent slots 86 to turn a corner.

The sidewalls 80, 90 of the head portion 8 and tail portion 9 of the socket generally defines inner and outer surfaces that are coaxial to one another relative to the longitudinal axis X. The inner surface of the sidewall 90 of the tail portion 9 is cylindrical, with a diameter of 12 mm, and is continuous with the inner surface of the sidewall 80 of the head portion 8. The inner and outer surfaces of the sidewall 80 of head portion 8 are cylindrical except where they are interrupted by the slots 86.

The diameter of the outer surface of the sidewall 80 of head portion 8 is approximately 19 mm. This is greater than the maximum diameter of the outer surface of the sidewall 90 of the tail portion 9—which is approximately 16.7 mm. These diameters generally correspond to the outer and inner diameters of the post 5 respectively.

Thus, as shown in FIG. 2, the head portion 8 protrudes from the open top of the post 5, whereas the tail portion 9 is recessed within the post 5. The sidewall 80 of the head portion 8 makes a radially-stepped transition to the sidewall 90 of the tail portion 9 via annular shoulder 10 which is seated on the upper end of the post 5, thereby limiting the extent of insertion of the socket 7 into the post 5.

Referring to FIGS. 3 and 4, which respectively show a perspective view and a side view of the socket 7 in isolation, the outer surface of the sidewall 90 of the tail portion 9 generally conforms to a confronting inner surface of the post 5. However, the outer surface of the sidewall 90 is not exactly cylindrical along its entire length. Rather, the outer surface comprises a first segment 9a, adjacent to the annular shoulder 10, that is cylindrical with an axial length of approximately 11.5 mm, and a constant diameter of 16.7 mm. This is followed via a first transition (as shown in dashed outline) to a second segment 9b, with an axial length of approximately 5.3 mm, that tapers slightly, radially-inwardly, from a diameter of 16.7 mm at that first transition with the first segment, to a diameter of 16.5 mm at a second transition with a third segment 9c—i.e. approximately 98% of the size of the inner diameter of the post. The gentle taper of the second segment 9b allows the tail portion 9 of the socket 7 to easily form a secure interference fit with the post 5 when inserted into the open top of the post 5 during assembly of the socket 7 and post 5 to one another.

The third segment 9c tapers more sharply, axially downward, and radially inward at an angle of 45 degrees relative to the longitudinal axis X. The third segment 9c tapers from diameter of approximately 16.5 mm at the second transition, to a diameter of 15.3 mm at an annular end 9d of the tail portion 9. Advantageously, this third segment 9c facilitates easy insertion of the tail portion 9 into the top of the post 5 as the reduced diameter obviates the need to precisely align the socket 7 and tail portion 9 during assembly. The reduced diameter at the end of the tail portion 9 is approximately 90% of the size of the inner diameter of the post, but in alternatives this may range between 70% to 95%, more preferably between 80% and 93%.

Together the inner surfaces of the sidewalls 80, 90 of the head portion 8 and tail portion 9 define a cylindrical part of the channel that leads between the top 7a and the bottom 7b of the socket 7, and via which the cord 2 can be inserted via the socket 7 into the post 5. Nonetheless, this internal channel is further defined by three fingers 91 that constrict the channel and, as will be described, serve to grip the elasticated cord 2 passing through the channel.

Referring to FIGS. 6 and 7, which are respectively an underneath and overhead view of the socket 7, the fingers 91 are integral with and extend radially inward from the inner surface of the sidewall 90 of the tail portion 9. The fingers 91 are identical in shape to one another and arranged circumferentially at equal 120 degree intervals around the longitudinal axis X. Furthermore, they are regularly and circumferentially-spaced from one another, with three gullies being defined between them. The gullies extend radially, and are also arranged circumferentially at 120 degree intervals.

At its radially-outermost part, each finger 91 has a wide root 92 via which it joins to the cylindrical inner surface of the sidewall 90 of the tail portion 9. The root 92 defines a circumferential lower edge 92a (as shown in FIG. 6), a circumferential upper edge 92b, and sloping edges 92c therebetween (as shown in FIG. 7). At its radially-innermost part, each finger 91 narrows to a tip 93, with each tip 93 at a radial distance of 2.3 mm from the central longitudinal axis X.

The circumferential distance—and so the gap—between adjacent fingers 91 is narrowest between their circumferential lower edges 92a. The gap has a distance of 2 mm, and represents the radially-outermost region of each gully.

Towards the central axis X, this gap and so the corresponding gully widens at an angle of 21.8 degrees, ultimately defining an open central region of the channel where the gullies join. The central region of the channel is surrounded the finger tips 93 which are disposed at equal intervals circumferentially around a central opening of diameter 4.6 mm. Advantageously, the central opening is wide enough to allow the 5 mm diameter elasticated cord 2 to be easily fed through it by undergoing a small level of elastic deformation, but narrow enough so that a gripping force results from the cord elastically reacting against the relatively inelastic finger tips 93.

Referring also to FIG. 5, which is cross-sectional view of the socket of FIG. 4, taken along lines B-B, and FIG. 8, which is a cross-sectional view of the socket of FIG. 6, taken along lines C-C, each finger 91 generally extends both radially-inward, and axially-downward from root 92 to tip 93.

Each finger 91 defines a fan-shaped radially-outwardly-facing underside 94 spanning from the circumferential lower edge 92a to the tip 93. Each finger 91 also defines radially-inwardly-facing surfaces, including a fan-shaped upper-slope 95, a mid-slope 96, and a lower-slope 97.

Each underside 94 and the upper-slope 95 conform to the shape of an inverted right circular cone, with an aperture of 60 degrees and centred with its apex on the central axis X. The cone followed by each underside 94 intersects with the circumferential lower edges 92a of the fingers 91. The cone followed by each upper-slope 95 is positioned axially higher along the central axis X, and intersects with the circumferential upper edges 92b of the fingers 91. Consequently, parallel surfaces of the underside 94 and upper-slope 95 of each finger 91 are separated by a regular thickness—of 1.5 mm. Additionally, the underside 94 and the upper-slope 95 of each finger 91 is oriented at the same steep angle relative to the central longitudinal axis X: 30 degrees if measured between the upper-slope 95 and the axis X, or 150 degrees if measured from the other side between the underside 95 and the axis X. For brevity, the former convention is used, defining the general "finger angle" as 30 degrees. In alternative embodiments, this finger angle may typically range between 5 and 60 degrees, preferably between 15 and 45 degrees, and more preferably between 20 and 40 degrees.

The lower-slope 97 extends vertically, in the axial direction, and the mid-slope 96 of each finger 91 has an intermediate angle that bridges the lower-slope 97 and the upper-slope 95. Additionally, the mid-slope 96 of each finger 91 has two facets that are mirrored and angled away from one another relative to a centreline 96a.

The lower-slope 97 forms a sharp-transition boundary with the underside 94, the sharp-transition boundary extending from the root 92 to the tip 93. The sharp-transition boundary also effectively bounds the gullies defined between the fingers 91. The sharp-transition boundary has an angle of 30 degrees in the present embodiment, but this may vary in alternative embodiments in the same way as the finger angle does.

Thus, in use, the radially-inwardly-facing surfaces are angled to smoothly guide an elastic cord 2 inserted in from the top of the socket 7 towards and through the central opening defined between the finger tips 93. However, attempting to retract the cord 2 causes it to snag on the sharp-transition boundary, thereby increasing the frictional engagement with the cord 2.

Additionally, as the sharp-transition boundary bounds the gullies defined between the fingers 91, and each gully narrows in the axially-upward, radially-outward direction, retraction cause the cord 2 to slide up and into one of the progressively narrowing gullies. This further pinches the cord 2, further increasing frictional resistance. This effect of this is enhanced when cord retraction force is in a direction transverse to the longitudinal axis X.

Advantageously, and as shown in FIG. 2, this is the case where the cord 2 is gripped firstly by the slot 86, and secondly by the fingers 91: i.e. the cord 2 follows a path between the fingers 91 and the slot holding the cord 2 that is angled away from the longitudinal axis X.

Additionally, the change of direction of the cord 2 passing through the holding slot 86—from horizontal outside the socket 7, to near-vertical within the socket 7—further enhances the gripping force on the cord 2. This is because the cord 2 is urged into and around a corner defined between the arcuate curve 87 at the bottom of the slot 86, and the inner surface of the sidewall 80 of the head portion 8. This effectively defines another transition upon which the cord 2 snags.

Thus, one of the slots 86, and the fingers 91 synergistically provide a gripping force on the cord 2 to prevent its unintentional retraction. In other words, in use, two sets of gripping structures are defined by the socket 7, with a first set being defined by the fingers 91, and a second set being defined by any one of the slots 86. Moreover, the spacing and orientation of each set of gripping structures causes the cord 2 to follow a non-linear path through the channel. Accordingly, the gripping structures grips the cord 2 more securely than can otherwise be achieved.

To remove the cord 2, a user merely needs to lift the part of the cord 2 outside the socket upwards, out of the slot 86 in which it is held, to a vertical orientation. This disengages the cord 2 from the slot 86, and also reduces the snagging effect of the fingers 91, allowing the cord to be retracted with relative ease.

It should be noted that the fingers 91 are relatively rigid, and so do not flex during retraction. This ensures that they are able to provide a predictable gripping force that is neither too small to adequately grip the cord in use, nor too large to prevent the cord from being retracted when required. Advantageously, the inflexibility of the material from which the socket 7 is generally constructed eliminates the likelihood that it, and the fingers 91 in particular, will break due to material fatigue. Nonetheless, in alternative embodiments, the fingers 91 may be constructed from a more resilient material.

The present embodiment utilises three finger 91 (and so three corresponding gullies) as gripping structures to grip the cord. Whilst a greater or fewer number of fingers and gullies may be employed for the same purpose in alternative embodiments, three is an optimal number. This is because each finger is radially-opposite a corresponding gully, and so, during insertion, a cord is guided by a finger in towards that radially-opposite gully. This facilitates insertion more so than, for example, two or four fingers and gullies. Whilst in principle five (or another odd-number) of fingers and gullies are possible to achieve a similar effect, there is limited space within the confines of the socket to make this practical.

As a whole, the barrier stand 3 of the present embodiment allows the cord 2 to be easily fed into the interior of the post 5, thereby providing a means by which the length of the cord between a pair of barrier stands 3 can be easily adjusted without needing to cut the cord to precisely the right length or tie knots in the cord.

Furthermore, the socket of the present embodiment allows this to be achieved via a relatively simple and inexpensive component. In particular, the socket, and the gripping structures in particular, are static in use, and so no moving parts are required to grip the cord.

Nonetheless, variations are possible to the above-described embodiment that lead to the same or similar features or advantages being achieved. Alternative embodiments of the invention are possible using different dimensions generally so long as the proportions of the structures of the barrier are maintained.

For example, the present embodiment described utilises an elasticated cord of a predetermined unstretched diameter of 5 mm. Gripping structures like the slots 86 are 3.5 mm in width, and the fingers present a central opening of diameter 4.6 mm. In alternatives, a cord 2 of a larger predetermined diameter can be used so long as the width of the slots, and diameter of the central opening is proportionally larger.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

The invention claimed is:

1. A barrier stand for an exhibition barrier, the barrier stand comprising:
   a post adapted to be mounted on a base so as to stand in a vertical position, the post defining an open top;
   a socket retained by the open top of the post, the socket defining a channel leading between an exterior of the barrier stand and a hollow interior of the post;

the socket further defining gripping structures for gripping a cord of the exhibition barrier extending along the channel;
   a first set of the gripping structures being shaped and arranged to permit insertion of the cord along the channel towards the interior of the post, but resist retraction of the cord away from the interior of the post; and,
   a second set of gripping structures shaped and arranged to grip the cord extending along the channel, the second set of gripping structures being spaced from the first set of gripping structures.

2. The barrier stand of claim 1, wherein the first set of gripping structures are shaped and arranged to increase their frictional engagement with the cord during its retraction away from the interior of the post.

3. The barrier stand of claim 1, wherein the first and second set of gripping structures are shaped and arranged to grip the cord at different orientations to one another so that the cord follows a non-linear path along the channel.

4. The barrier stand of claim 1, wherein the socket comprises a tail portion fitted within the top of the post, and a head portion protruding from the top of the post, the channel defined by the socket extending through the tail portion and head portion.

5. The barrier stand of claim 4, wherein the tail portion comprises a sidewall having an outer surface that is sized and tapered relative to an inner surface of the post to form an interference fit with it.

6. The barrier stand of claim 5, wherein the outer surface of the sidewall of the tail portion narrows at an end of the tail portion to between 70% and 95% of the size of the inner diameter of the post.

7. The barrier stand of claim 1, wherein the socket is constructed from an integral piece of material.

8. The barrier stand of claim 1, wherein the socket is constructed from an inflexible material.

9. The barrier stand of claim 1 including
   an elasticated cord of predetermined diameter to form an exhibition barrier.

10. The barrier stand of claim 9, wherein the elasticated cord is suspended between and gripped by the barrier stand and an other barrier stand.

11. A barrier stand for an exhibition barrier, the barrier stand comprising:
   a post adapted to be mounted on a base so as to stand in a vertical position, the post defining an open top; and
   a socket retained by the open top of the post, the socket defining a channel leading between an exterior of the barrier stand and a hollow interior of the post;
   the socket further defining gripping structures for gripping a cord of the exhibition barrier extending along the channel;
   a first set of the gripping structures being shaped and arranged to permit insertion of the cord along the channel towards the interior of the post, but resist retraction of the cord away from the interior of the post, wherein the socket comprises a tail portion fitted within the top of the post, and a head portion protruding from the top of the post, the channel defined by the socket extending through the tail portion and head portion, wherein the tail portion defines the first set of gripping structures, and the head portion defines a second set of gripping structures.

12. The barrier stand of claim 11, wherein the second set of gripping structures comprises at least one slot defined by the head portion that is open at its upper end to receive a cord of predetermined diameter, the slot being shaped and arranged to pinch the cord thereby to grip it.

13. The barrier stand of claim 12, wherein the second set of gripping structures defined by the head portion comprises a plurality of slots, equidistantly spaced at regular intervals about the periphery of the head portion.

14. A barrier stand, for an exhibition barrier, the barrier stand comprising:

a post adapted to be mounted on a base so as to stand in a vertical position, the post defining an open top;

a socket retained by the open top of the post, the socket defining a channel leading between an exterior of the barrier stand and a hollow interior of the post;

the socket further defining gripping structures for gripping a cord of the exhibition barrier extending along the channel; and, a first set of the gripping structures being shaped and arranged to permit insertion of the cord along the channel towards the interior of the post, but resist retraction of the cord away from the interior of the post, wherein the first set of gripping structures comprise at least one finger that extends, from a wide root to a narrow tip of the finger, in a direction that is axially-downward with respect to a central longitudinal axis, towards the interior of the post.

15. The barrier stand of claim 14, wherein the at least one finger is oriented at a finger angle of between 15 and 45 degrees with respect to the central longitudinal axis.

16. The barrier stand of claim 14, wherein the at least one finger defines at least one gully that widens in a direction that is axially-downward with respect to the central longitudinal axis.

17. The barrier stand of claim 16, wherein the at least one finger defines a sharp-transition boundary located at a boundary between the at least one finger and the at least one gully.

18. The barrier stand of claim 14, wherein the first set of gripping structures comprise a plurality of fingers that extend radially-inward and axially-downward with respect to the central longitudinal axis, the plurality of fingers defining a corresponding plurality of gullies between them, and the fingers being circumferentially arranged and spaced from one another.

19. The barrier stand of claim 18, wherein the fingers define an open central region of the channel via which the cord can extend, the open central region of the channel being circumferentially surrounded at regular intervals by the tips of the fingers.

20. The barrier stand of claim 18, wherein the first set of gripping structures comprise three fingers that define three gullies between them, and the fingers being circumferentially arranged and spaced from one another at 120 degree intervals.

21. A socket for use with a barrier stand for an exhibition barrier, the barrier stand including a post adapted to be mounted on a base so as to stand in a vertical position, the post defining an open top, the socket retained by the open top of the post, comprising:

a channel leading between an exterior of the barrier stand and a hollow interior of the post;

gripping structures for gripping a cord extending along the channel, wherein a first set of the gripping structures being shaped and arranged to permit insertion of a cord of the exhibition barrier along the channel towards the interior of the post, but resist retraction of the cord away from the interior of the post, wherein a second set of the gripping structures being shaped and arranged to grip the cord extending along the channel, the second set of the gripping structures being spaced from the first set of the gripping structures.

* * * * *